March 10, 1964    E. E. CONLEY    3,124,001
PRESSURE VESSEL
Filed Feb. 19, 1960
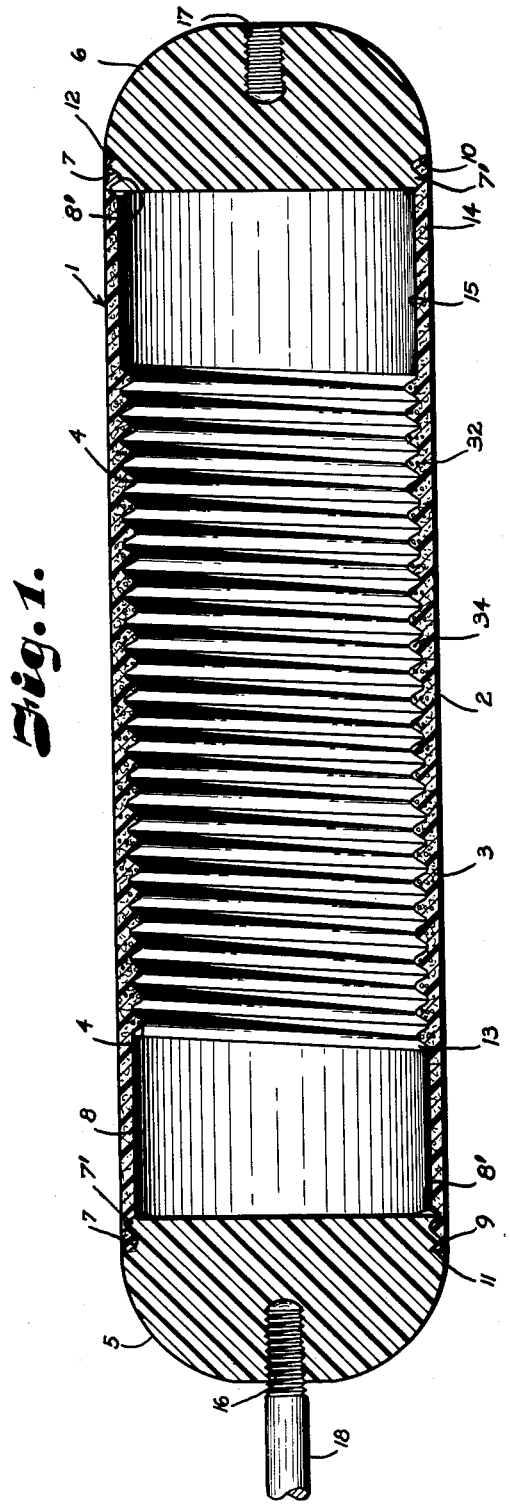
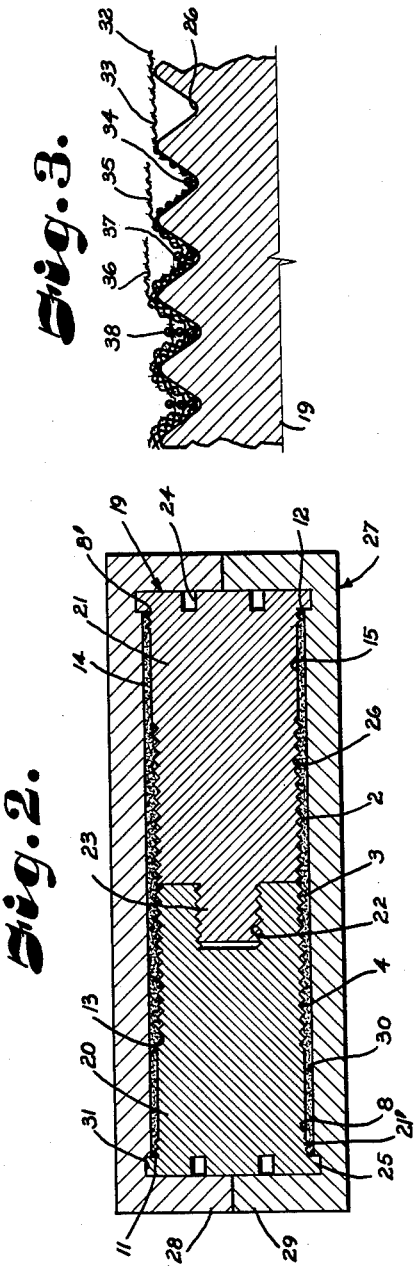
INVENTOR.
Edwin E. Conley.
BY
Fishburn and Gold
ATTORNEYS.

United States Patent Office 3,124,001
Patented Mar. 10, 1964

3,124,001
PRESSURE VESSEL
Edwin E. Conley, Tulsa, Okla., assignor to Conley Corporation, Tulsa, Okla., a corporation of Oklahoma
Filed Feb. 19, 1960, Ser. No. 9,828
4 Claims. (Cl. 73—322.5)

This invention relates to pressure vessels, and more particularly to vessels designed to withstand external pressures.

Vessels for withstanding external pressures are required for many applications. One of the most demanding uses, however, is in high pressure tanks or reaction towers wherein a closed hollow vessel acts as a float in conjunction with a device for controlling the level of low density, corrosive fluids under very high pressures, such as is found in oil refineries and the like.

The principal objects of the present invention are to provide a relatively lightweight hollow vessel for withstanding pressures of high magnitudes; to provide such a vessel adapted to be subjected to high external pressures without collapsing, buckling or rupture; to provide a pressure vessel for withstanding external pressures which is fabricated of high strength, corrosion resistant materials; to provide a float for high pressure tanks which is lightweight and inexpensive to produce; to provide a high pressure float of fiber-reinforced resin which is formed at low pressure with a plurality of reinforcing ribs on the interior thereof which resist collapsing of the vessel; to provide a high pressure hollow vessel of resin reinforced with fiber fabric and strands in the walls wherein the strands extend circumferentially and pull the fabric into conformity to the internal surface thereof; and to provide a high pressure vessel with fabric reinforcing stressed circumferentially and longitudinally.

Other objects and advantages of this invention will become apparent from the following description taken in connection with the accompanying drawings, wherein are set forth by way of illustration and example certain embodiments of this invention.

FIG. 1 is a longitudinal sectional view of the pressure vessel.

FIG. 2 is a longitudinal sectional view of a mold containing an externally threaded mandrel and the cylindrical walls of the pressure vessel.

FIG. 3 is a detailed sectional view of the external threads on the mandrel of FIG. 2, illustrating a method of laying fabric and reinforcing strands thereon.

Referring more in detail to the drawings:

1 designates a fiber-reinforced resin hollow pressure vessel particularly designed to withstand external pressures. The vessel is comprised of a shell 2 having a preferably generally cylindrical shape but it may be somewhat elliptical if desired. The shell 2 has walls 3, the interior of which has a plurality of internal reinforcing ribs 4 which, in this example, are in a helical or screwlike formation. Circumferential reinforcing ribs may be used in place of helical ribs from a strength standpoint, however, as will appear hereinafter, helical ribs lend themselves to ease and economies of fabrication. The vessel has end members 5 and 6 with reduced portions 7 which extend into the bore 8 of the shell and define shoulders 9 and 10 which engage with the ends 11 and 12 of the shell. In the illustrated structure, the reduced portions 7 have screw threads 7' which are engaged with internal threaded portions 8' at the end portions of the shell 2 to provide leakproof joints, however, the reduced portions may be sleeved into the end portions of the shell and suitably secured to support same. The end members 5 and 6 whether threaded or plain are preferably suitably secured to the shell 2 to seal the pressure vessel as by an adhesive to prevent leaking of gas or fluid into the interior thereof. The end members 5 and 6 may be fabricated in any convenient manner of the same or a compatible resin with that of the shell 2, and it is generally unnecessary to use fiber reinforcing therefor due to lower strains in comparison with shell 2.

Since it is important that a pressure vessel used as a float be as light as possible in proportion to its displacement volume, the reinforcing ribs 4 preferably are placed only in spaced relation to the end members or in areas where the strain on shell 2 is not sufficiently resisted by said end members. In the illustrated structure, the reinforcing ribs 4 terminate as at 13 in spaced relation to the end members 5 and 6, and the end portions 14 of the shell 2 are of substantially uniform thickness with smooth inner surfaces 15 from said ribs 4 to the ends 11 and 12 of the shell 2. It is to be noted, however, that reinforcing ribs 4 may be extended to the end members 5 and 6, and the ribs in the central portion of the shell 2 made heavier if the strain due to the particular application justifies the additional weight.

The end members 5 and 6 have internally threaded sockets 16 and 17 respectively extending axially therein for mounting the vessel on a rod 18 of a level controlling device.

A method for fabricating the shell 2 is best illustrated by reference to FIGS. 2 and 3 wherein a threaded cylindrical mandrel 19 is used in combination with a mold 27 to produce the shell. The mandrel 19 preferably is composed of two sections 20 and 21 which are suitably and releasably connected together. In the illustrated structure, the mandrel section 20 contains an internally threaded socket 22 at one end thereof for receiving threaded male extension 23 at the adjacent end of mandrel section 21. The mandrel 19 has torque tool-receiving sockets 24 or other devices for effecting relative rotation of the mandrel sections for separation. The lead of the screw threads on the mandrel extension 23 is the same as the lead of the helix of the ribs 4 and the threads 7' for removal of the mandrel sections from the shell as later described. The mandrel sections 20 and 21 each have annular flanges 25 extending outwardly therefrom at the ends remote from the socket 22 and extension 23 whereby, when the mandrel sections are joined, the spacing between the flanges 25 corresponds to the length of the shell 2. The bodies of the sections 20 and 21 between the flanges are preferably cylindrical with enlarged threaded portions 21' adjacent the flanges 25 and helical grooves 26 are cut into said bodies to correspond to the position and shape of the helical ribs 4 formed in the shell. It is preferred that when assembled the grooves on the mandrel sections align to form a continuous helical groove. In making the shell, it is preferred that the mandrel be releasably contained within a split mold 27 which is composed of two sections 28 and 29 which, when closed, define a cylindrical cavity 30 with annular grooves 31 at the ends thereof for receiving and supporting the flanges 25 of the mandrel 19. The space between the bodies of the mandrel 19 and the interior cylindrical surface of the mold cavity 30 determines the thickness and shape of the walls 3 of the shell 2.

It is known that some fiber-reinforced plastics exhibit high strength characteristics. In order to achieve this high strength, however, it is necessary to use reinforcing fibers or filaments of very high strength. Glass fibers or filaments have been found to be desirable for this purpose when properly arranged in the product.

In the high strength fiber-reinforced plastic pressure vessel of the present invention, the fibers are placed and arranged in positions where they assume the high stresses of the structure both circumferentially and longitudinally with particular attention afforded the reinforcing ribs 4 to insure their proper strength.

Resin-saturated glass fiber fabric 32 is wrapped in tension circumferentially of the body of the mandrel 19 between the flanges 25 whereby the fabric extends around said body in engagement with the lands 33 between the grooves 26. A strand 34 of glass fibers or other suitable material is then wound under tension around the fabric 32 with the strand 34 in alignment with the grooves 26 between the lands 33 to pull the glass fiber fabric into substantial conformity with the contour of said rib forming grooves 26 and lands 33 therebetween. Then additional layers or laminations of glass fiber fabric 35 and 36 are wound on the mandrel body between the flanges 25 and strands 37 and 38 are respectively wound over the laminations of fabric 32 and 35 under tension and in alignment with the thread grooves 26 to assure a dense fiber structure in the reinforcing ribs 4 particularly in the crest thereof. Sufficient layers of fabric are wrapped around the mandrel 19 between the flanges 25 to bring the wall of the shell to the desired thickness. The wrapped mandrel 19 is then placed into the split mold 27. Additional resin may be placed into the mold 27 to insure that the mold cavity will be completely filled.

The sections 28 and 29 of mold 27 are held together under pressure, and the mold is heated to a suitable temperature to induce hardening or curing. After curing, the mold 27 is opened, and the mandrel with the shell thereon is removed. Then the mandrel sections 20 and 21 are rotated counter-clockwise with respect to each other by means of a suitable torque tool placed in receiving sockets 24 which results in the withdrawal of one of the mandrel sections from the shell 2. The shell 2 is then rotated with respect to the other mandrel section for removal thereof. While a mold to form the exterior of the shell is desired, the molding may be performed by wrapping an excess of resin-saturated fabric on the mandrel and then subjecting the wrapped mandrel to heat to cure the resin. After curing, the shell may be machined to a desired outside diameter and the mandrel sections removed therefrom.

The plastic material or resin used in shell 2 may vary, depending upon the particular application. Since the float may be subjected to high temperatures, it is usually preferable to use a thermosetting resin. Satisfactory results have been obtained with such thermosetting polyester resins as allyl, alkyd, epoxy or furan. Also, combinations of resins can be used. It is desirable that a curing catalyst be added to the resin before the reinforcing cloth is saturated therewith. After the shell is molded and cured and removed from the mandrel, the end members 5 and 6 are suitably secured to the end portions of the shell to close said ends with said end members supporting the shell wall 3 adjacent thereto. The finished vessel may then be assembled on a rod 18 or otherwise placed in use.

It has been found that the internal ribs 4 formed as described are very dense with high concentrations of fibers at the crests and the strands pulling the fabric into the grooves 26 place said fabric in tension longitudinally of the mandrel as well as circumferentially. The strand and fabric content in the reinforcing ribs give circumferential strength whereby the ribbed structure provides a substantial increase in collapsing strength over a similar pressure vessel without such reinforcing ribs. Vessels of this type manufactured without internal ribs, but otherwise identical, collapsed under conditions of pressure far less severe than those withstood by the ribbed pressure vessel of this invention.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. A high pressure float of resinous material for use with low density fluids under high pressure comprising, an elongate cylindrical hollow shell having thin walls with open ends and cylindrical inner surfaces adjacent thereto, end members having cylindrical portions sleeved into the shell ends and sealingly secured thereto in radially supporting relation to the ends of said shell, said shell having on the inside surface thereof spaced from said end members helical reinforcing ribs integral with said shell with the inner diameter of the shell between the ribs being no greater than the diameter of the inner surface adjacent the shell ends, said shell and ribs having reinforcing material embedded therein adjacent the inner surface thereof whereby said float exhibits low weight for its displacement volume while having high collapsing strength.

2. A high pressure float of resinous material for use with low density fluids under high pressure comprising, an elongate cylindrical hollow shell having thin walls and open ends, end members having portions sleeved into the ends of the shell and adhesively secured thereto in sealed and radially supporting relation to the ends of said shell, said end members having means therein for operatively mounting said float, said shell having on the inside surface thereof spaced from said end members helical reinforcing ribs integral with said shell, said shell and ribs having a plurality of stressed glass fiber fabric laminations extending circumferentially therein, said ribs having strands extending circumferentially therein between said fabric laminations whereby said float exhibits low weight for its displacement volume while having high collapsing strength.

3. A fiber reinforced resin pressure vessel for withstanding external pressure comprising, a hollow elongate cylindrical shell of thermosetting resin having glass fibers in the walls thereof, said shell having open ends with cylindrical inner surfaces extending inwardly therefrom, end members having portions sleeved into the shell ends and secured thereto in sealed and radially supporting relation to the ends of the walls of said shell, a plurality of inwardly extending ribs integral with said shell wall, said ribs extending substantially circumferentially of said shell wall with the diameter of the wall between the ribs being no greater than the diameter of said cylindrical inner surfaces between the ribs and end members, a lamination of glass fiber fabric in the walls of said shell and extending circumferentially thereof under tension, said lamination of the glass fiber fabric in the shell conforming substantially to the contour of the internal ribs and inner surface of said shell wall, and a fibrous strand having relatively high tensile strength extending circumferentially of said shell wall in alignment with the ribs therein and substantially engaging the outer surface of the inner lamination of the glass fiber fabric in the apex of said ribs, said fibrous strand being in tension whereby said ribs have relatively high density of glass fibers to resist collapsing of the shell wall under external pressure.

4. A fiber reinforced resin pressure vessel for withstanding external pressure comprising, a hollow elongate cylindrical shell of thermosetting resin having laminations of glass fibers in the walls thereof, said shell having open ends with cylindrical inner surfaces extending inwardly therefrom, resin end members having cylindrical portions sleeved into the shell ends and secured thereto in sealed and radially supporting relation to the ends of the walls of said shell, a plurality of inwardly extending ribs integral with said shell wall and spaced from said end members, said ribs extending substantially in a helix on said shell wall with the inner diameter of the wall between the ribs being no greater than the diameter of the cylindrical inner surfaces between the ribs and the end members, a plurality of laminations of glass fiber fabric in the walls of said shell under tension circumferentially and longitudinally of said shell wall, the inner laminations of the glass fiber fabric in the shell conforming substantially to the contour of the internal ribs and inner surface of said shell wall, a fibrous strand having relatively high tensile strength extending substantially circumferentially of said shell wall in alignment with the ribs therein and substantially engaging the outer surface of the inner lamination of the glass fiber fabric in the apex of said ribs, said fibrous strand being in tension, and fibrous strands under tension extending circumferentially of said shell wall intermediate the other laminations of glass fiber fabric therein whereby said ribs have relatively high density of glass fibers to resist collapsing of the shell wall under external pressure.

References Cited in the file of this patent

UNITED STATES PATENTS

| | | |
|---|---|---|
| 1,246,947 | Schott | Nov. 20, 1917 |
| 1,832,693 | Eggleston | Nov. 17, 1931 |
| 2,322,818 | Brockett | June 29, 1943 |
| 2,614,058 | Fracis | Oct. 14, 1952 |
| 2,744,043 | Ramberg | May 1, 1956 |
| 2,751,237 | Conley | June 19, 1956 |
| 2,809,762 | Cardona | Oct. 15, 1957 |
| 2,827,195 | Kearns | Mar. 18, 1958 |
| 2,827,414 | Bussard et al. | Mar. 18, 1959 |
| 2,915,425 | Biedebach | Dec. 1, 1959 |

FOREIGN PATENTS

| | | |
|---|---|---|
| 738,671 | Great Britain | Oct. 19, 1955 |
| 1,214,626 | France | Nov. 9, 1959 |